(12) United States Patent
May

(10) Patent No.: US 7,635,287 B2
(45) Date of Patent: Dec. 22, 2009

(54) GAME CALL

(76) Inventor: James C. May, P.O. Box 219, Rickreall, OR (US) 97371

( * ) Notice: Subject to any disclaimer, the term of this patent is extended or adjusted under 35 U.S.C. 154(b) by 213 days.

(21) Appl. No.: 11/403,401

(22) Filed: Apr. 12, 2006

(65) Prior Publication Data

US 2007/0243790 A1    Oct. 18, 2007

(51) Int. Cl.
*A63H 5/00* (2006.01)
*A63H 33/00* (2006.01)

(52) U.S. Cl. .................... 446/207; 446/208; 84/383 A; 84/383 R

(58) Field of Classification Search ......... 446/207–209; 43/1; 84/383 A, 383 R, 408–410
See application file for complete search history.

(56) References Cited

U.S. PATENT DOCUMENTS

| | | | |
|---|---|---|---|
| 1,506,364 A * | 8/1924 | Hippolyte et al. | 84/383 R |
| 1,790,167 A * | 1/1931 | Ogilvie | 84/383 A |
| 2,296,737 A * | 9/1942 | Peterson | 84/383 A |
| 2,342,836 A * | 2/1944 | Brilhart | 84/383 A |
| 2,456,299 A * | 12/1948 | Miller | 84/383 A |
| 2,473,210 A * | 6/1949 | Magnus | 84/377 |
| 3,406,479 A | 10/1968 | Faulk | |
| 3,420,132 A * | 1/1969 | Backus | 84/383 A |
| 3,991,513 A | 11/1976 | Faulk | |
| 4,143,485 A | 3/1979 | Stewart | |
| 4,888,903 A | 12/1989 | Knight et al. | |
| 4,940,451 A | 7/1990 | Leady | |
| 4,950,201 A | 8/1990 | Sceery | |
| 5,222,903 A | 6/1993 | Parrott et al. | |
| 6,053,794 A * | 4/2000 | Weiser | 446/207 |
| 6,152,798 A | 11/2000 | Raburn | |
| 6,682,388 B1 | 1/2004 | Foster | |
| D498,165 S | 11/2004 | Primos et al. | |
| 7,384,323 B2 * | 6/2008 | Sceery | 446/208 |

* cited by examiner

*Primary Examiner*—Kien T Nguyen
(74) *Attorney, Agent, or Firm*—Crowell Ing, LLP; Carl D. Crowell; Nye Wang

(57) ABSTRACT

An improved game call with a game call reed wherein said reed has a restraining end for attachment to a call and a unrestrained end with a non-linear edge for providing improved moisture dissipation, and producing calls more closely matching that of natural animal calls.

20 Claims, 3 Drawing Sheets

GAME CALL

BACKGROUND

This invention relates game calls and the reeds used in game calls, specifically to a game call with a reed specially serrated and smoothed to form a non-linear edge which, when used, produces an improved call that is enhanced with the subtle raspy sounds found in the vocalizations of waterfowl.

Reed type game calls generally consist of a channel which guides a caller's breath to a reed. The reed is typically a thin flexible material secured on one end to allow its unrestrained end to move freely. The force of the caller's expelled air is channeled to the reed causing the reed to vibrate. This vibration produces a sound similar to a natural animal call. The purpose of generating such a sound is to attract animals to the caller. A call with better ability to replicate natural animal calls will be more likely to attract animals to its caller.

To operate a reed type game call, the caller blows into the call. The moisture in the caller's breath creates a problem when it accumulates around the reed of the prior art, altering the reed's vibration and thus adversely affects the call's accuracy. Moisture accumulation is especially a problem. Cold conditions may cause such moisture to freeze rendering the call inoperable. Reed type game calls in the prior art have attempted to remedy this by providing a means of escape for moisture typically by tapering or cutting channels in the structure to which the reed attaches.

U.S. Pat. No. 6,152,798 describes a game call that uses a rectangular or tapered reed made of a thin flexible material. While this design produces a realistic call, its solid unbroken linear edge, even when tapered, fails to replicate the raspy sounds found in the calls of waterfowl. Additionally, the solid edge does not allow for the escape of moisture. As such, a call using such a reed must rely solely on its reed attachment structure to dissipate moisture.

U.S. Pat. No. 5,222,903 also describes a reed made of thin flexible material, but has its unrestrained end rounded off to form a semicircle with a diameter equal to the width of the reed. As above, this unbroken linear edge does not facilitate the escape of moisture and cannot fully replicate the natural calls of waterfowl.

U.S. Pat. No. 6,682,388 describes a bone shaped reed. Its hourglass shape allows moisture to dissipate and prevents adverse effects to call accuracy from moisture by reducing the surface contact between the reed and its surrounding structures. As with a tapered reed, the hourglass shape reduces the amount of air required to make a call. This design, however, also has an unbroken linear edge which limits its accuracy.

What is desired and herein provided is an improved game call and reed which is compatible with widely used reed type calls that allows a caller to generate louder calls with improved accuracy, realism, and tone over existing reeds while improving moisture dissipation, and without requiring special training or additional effort by the caller. The specific improvements of the present invention relate to the utilization of a novel smoothed serrated non-linear edge that results in a reed with improved call accuracy, moisture dissipation, and volume.

SUMMARY OF THE INVENTION

The subject of this invention is a serrated or non-linear game call reed made from a flexible material. The novel edge of the reed's unrestrained end creates a reed that can dissipate moisture and generate the subtle sounds found in natural animal calls while outputting a louder call without additional effort by the caller.

PREFERRED EMBODIMENT OF THE INVENTION

Figure 1:
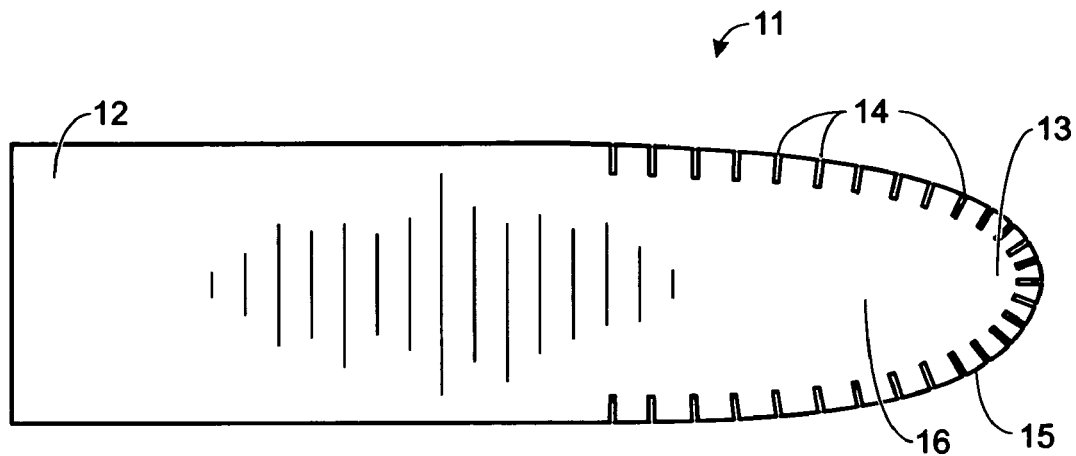
FIG. 1 is a top view of the reed, showing the nonlinear serrated edge of the reed.

In its preferred embodiment, the a traditional game call 40 is fitted with a reed 11 is generally flat having definite length and width, made from a thin flexible material such as MYLAR™ by duPont. The reed 11 has a restraining end 12 for attachment to a reed type call. Opposite from the restraining end 12 is an unrestrained end 13 that is sized and finished to produce vibrations of the proper frequency when air is forced around the reed 11. The unrestrained end 13 is non-linear and has a series of serrations 14, preferably of equal length and evenly spaced, along the unrestrained end's 13 smoothed edge 15. The modified edge 15 of reed 11 results in a louder call over reeds with traditional edges. The unrestrained end field 16 of the unrestrained end 13 may be finished though polishing or lightly sanded to thin the reed 11 or provide a textured surface, further improving or altering the call sound.

In its preferred embodiment, the serrations 14 run inward from the smoothed edge 15 of the unrestrained end 13, and are preferably substantially perpendicular to the smoothed edge 13 where a serration 14 is made as shown in FIG. 1. In the preferred embodiment, the serrations 14 measure less than 25% of the width of the reed 11. The serrations 14 allow the reed 11 to generate a raspy sound which more closely matches natural animal calls, and create a space for moisture from a caller's breath to escape. The reed 11 can be tuned to generate a higher or lower pitch by adjusting angle and length of the serrations 14 and the thickness of the reed 11 as a whole and the finish, polish, texture or thickness of the unrestrained end field 16.

The preferred embodiment can be configured to match traditional reeds to be compatible with commonly used reed type calls. The reed 11 is preferably made of MYLAR™ of a thickness to provide suitable sound quality and tone with serrations 14 approximately 1/16 of an inch long and evenly spaced.

Figure 2:
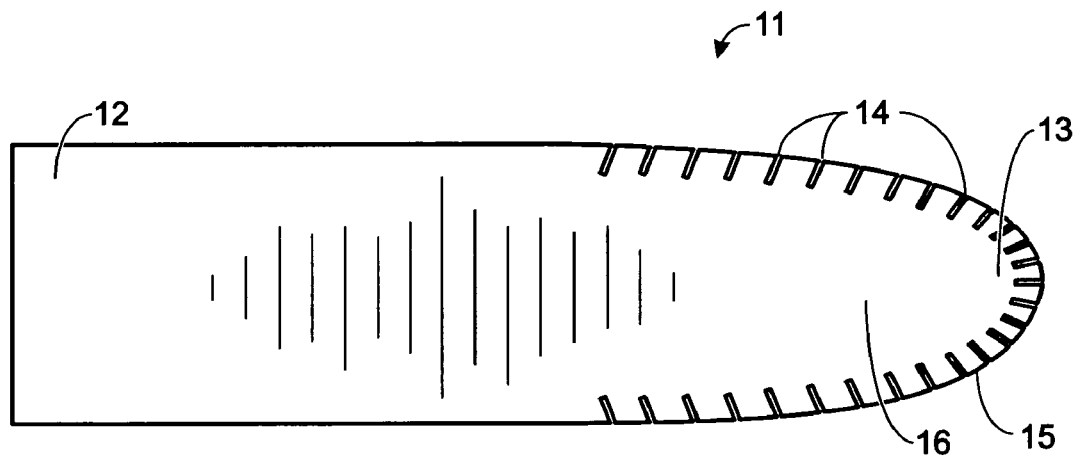
FIG. 2 is an alternate embodiment of the reed.

In an alternate embodiment, as shown in FIG. 2, the serrations 14 of the reed 11 are angled forward toward the unrestrained end 13.

Figure 3:
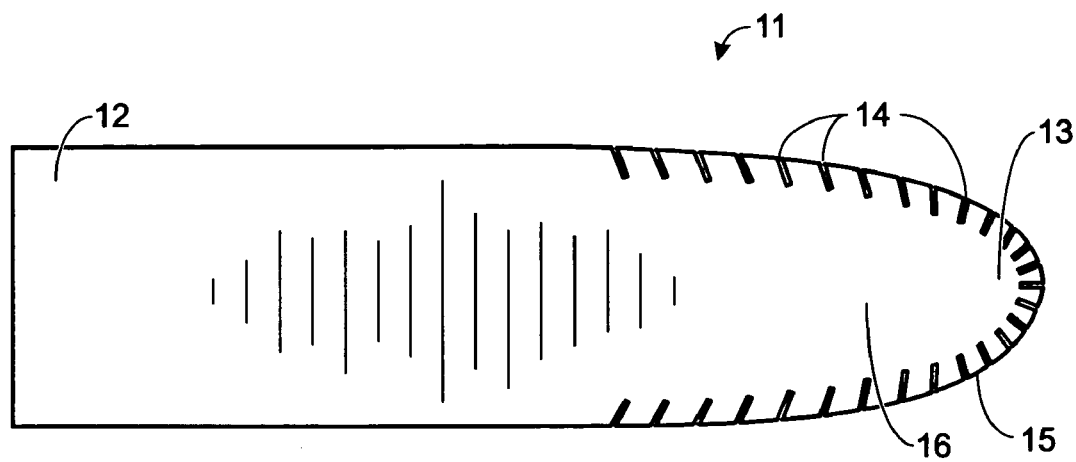
FIG. 3 is an alternate embodiment of the reed.

In another alternate embodiment, as shown in FIG. 3, the serrations 14 of the reed 11 are angled rearward toward the restraining end 12.

Figure 4:
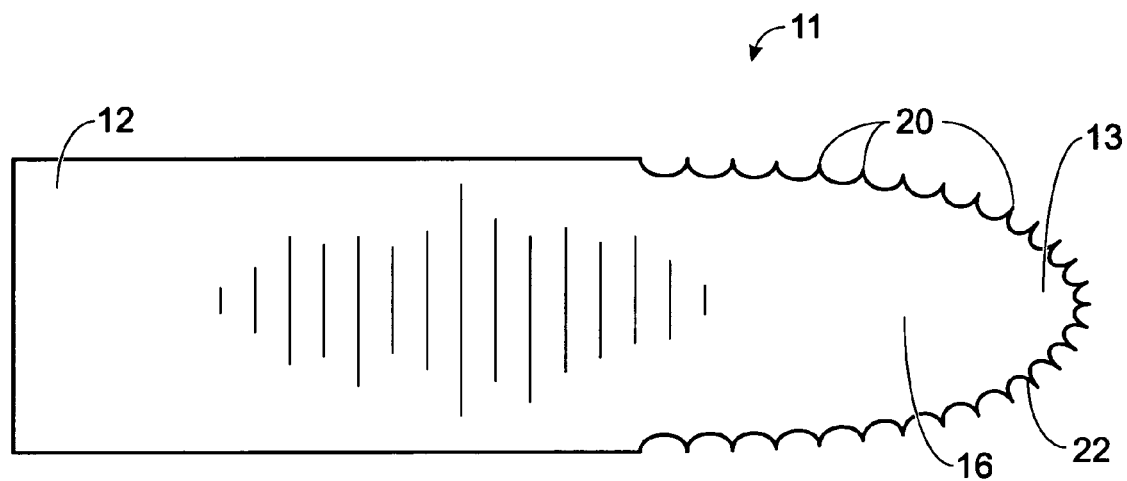
FIG. 4 is an alternate embodiment of the reed.

In another alternate embodiment, as shown in FIG. 4, the unrestrained end 13 has a non-linear edge comprised of a perimeter with a plurality of points 20, each point heading peak element 22.

Figure 5:
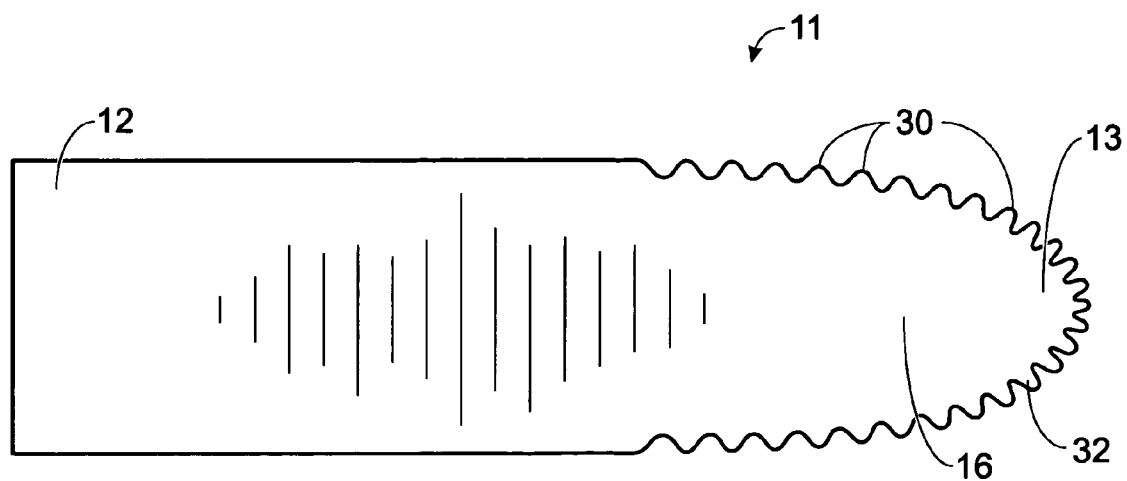
FIG. 5 is an alternate embodiment of the reed.
Figure 6:
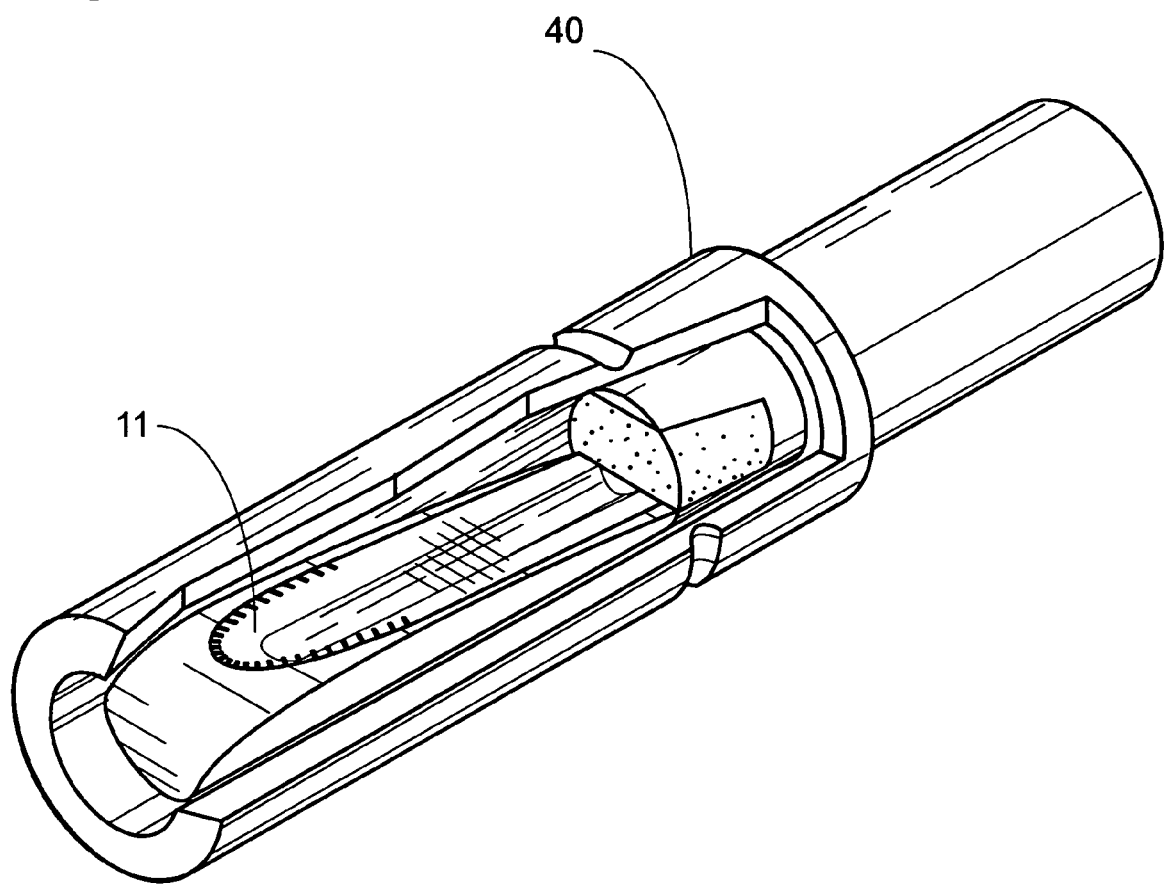
FIG. 6 is a perspective cut away view of a game call.

In yet another alternate embodiment, as shown in FIG. 5, the unrestrained end 13 has a non-linear edge comprised of a perimeter with a plurality of wave forms 30, each undulation the wave forming a tongue element 32.

The terms and expressions which have been employed in the foregoing specification are used herein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A game call with an enclosed reed comprising:
   a length of a solid flexible and substantially flat material;
   a restraining end for attaching said reed to a enclosed reed type game call;
   distal to said restraining end an unrestrained end with a non-linear edge consisting of a plurality of full serrations;
   wherein the said plurality of full serrations are closely spaced, circumferential to the said unrestrained end and fully penetrate said non-linear edge.

2. The game call of claim 1 further comprising a finished unrestrained end field.

3. The game call of claim 1 wherein the said plurality of full serrations are angled rearward toward said restraining end.

4. The game call of claim 1 wherein the said plurality of full serrations are angled forward toward said unrestrained end.

5. The game call of claim 1 wherein the said length of sold flexible material is MYLAR.

6. The game call of claim 1 wherein the said plurality of full serrations are concaved semi circular shaped whereby forming a plurality of points along the said non-linear edge.

7. The game call of claim 1 wherein the said plurality of full serrations consist of a plurality of wave forms.

8. The game call of claim 1 wherein the said plurality of full serrations are symmetrical along the said non-linear edge.

9. The game call of claim 1 wherein the said plurality of full serrations are of equal dimensions and evenly spaced along the said unrestrained end.

10. The game call of claim 1 wherein the said the said plurality of full serrations are no longer than ¼ the width of the said enclosed reed.

11. A game call reed for an enclosed reed style game call comprising:
    a length of a solid flexible and substantially flat material;
    a restraining end;
    distal to said restraining end an unrestrained end with a non-linear edge, wherein the non-linear edge is perimetered with a plurality of full serrations;
    and wherein the said plurality of full serrations are closely spaced, circumferential to the said unrestrained end and fully penetrate said non-linear edge.

12. The game call reed of claim 11 wherein said plurality of full serrations are angled rearward toward said restraining end.

13. The game call reed of claim 11 wherein said plurality of full serrations are angled forward toward said unrestrained end.

14. The game call reed of claim 11 wherein the said plurality of full serrations are concaved semi circular shaped whereby forming a plurality of points along the said non-linear edge.

15. The game call reed of claim 11 wherein the said plurality of full serrations consist of a plurality of wave forms.

16. The game call reed of claim 11 wherein further comprising a finished unrestrained end field.

17. The game call reed of claim 11 wherein the said length of flexible material is MYLAR.

18. The game call reed of claim 11 wherein the said plurality of full serrations are symmetrical along the said non-linear edge.

19. The game call reed of claim 11 wherein the said plurality of full serrations are of equal dimensions and evenly spaced along the said unrestrained end.

20. The game call reed of claim 11 wherein the said plurality of full serrations are no longer than ¼ the width of the said game call reed.

* * * * *